Figure 1:
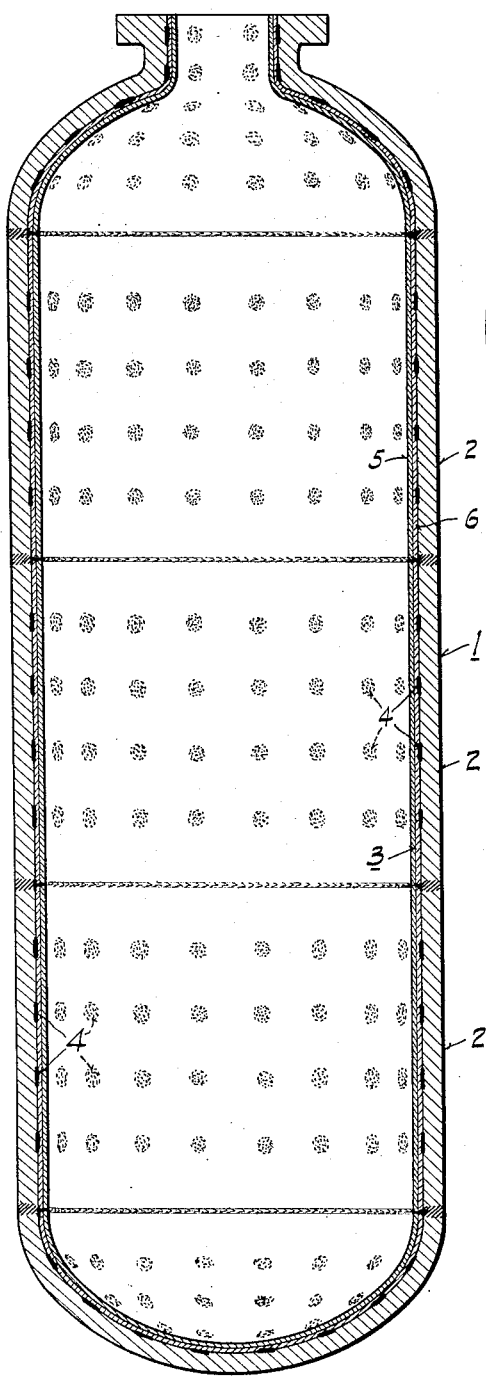

Sept. 24, 1935.  O. E. ANDRUS  2,015,173

UNITING METAL PARTS

Filed June 17, 1933

INVENTOR.
Orrin E. Andrus
BY
ATTORNEY.

Patented Sept. 24, 1935

2,015,173

UNITED STATES PATENT OFFICE 2,015,173

UNITING METAL PARTS

Orrin E. Andrus, Milwaukee, Wis., assignor to A. O. Smith Corporation, Milwaukee, Wis., a corporation of New York Application June 17, 1933, Serial No. 676,271

4 Claims. (Cl. 219—10)

This invention relates to a method of uniting metal parts in laminated relation and has for its general object a method of welding metal parts having unlike welding characteristics.

Although the invention has other applications, as will become evident as the specification proceeds, it has been found to be particularly effective for welding thin sheets of corrosive resistant metal to a base plate of steel. One instance of this is in welding thin alloy liners to the interior of oil cracking vessels or to other vessels subjected to severe corrosive action.

One method of applying such a lining is disclosed in Patent No. 1,680,276 granted to Sune Hermanson and myself on August 14, 1928 and comprises, generally speaking, bonding a corrosive resistant metal sheet to the base metal by electric resistance spot welding at closely adjacent spots.

The method therein described has been used with success for lining vessels with chromium-iron alloys and chromium-nickel-iron alloys all of which alloys are predominantly iron and which have welding characteristics which enable the corrosive resistant liner to be effectively joined to the steel base plate.

In certain special cases other metals such as nickel, copper, Monel metal and certain bronzes have been found to afford better protection than chromium-iron alloys or chromium-nickel-iron alloys. For example in chemical processing apparatus wherein caustic alkali is employed as one of the reagents, nickel has been found to be very effective.

However, when attempting to resistance spot weld a sheet of corrosion resistant material such as nickel, copper, Monel metal and certain bronzes in the manner described in the above patent, certain obstacles are encountered. These metals have electrical and physical characteristics different from the steel plate which make it difficult to maintain welding conditions necessary to produce the desired bond between the liner and base plate.

One of the factors apparently contributing to the difficulties is the lower resistance of these types of metals as compared to the steel to which it is to be joined. Another troublesome factor is the relatively greater heat conductivity of these metals compared to that of the steel to which they are to be united. These difficulties may be overcome in certain instances by increasing the current concentration and applying the current for a short period of time. Such practice is not entirely satisfactory in all cases and particularly when it is desired to spot weld extended surfaces.

One of the difficulties that arises in the progressive spot welding of certain alloy sheets to a steel vessel wall or other plate is that during the formation of a series of the spot welds heat runs forward from these welds and produces oxide discoloration upon the sheet, and in certain cases this oxide formation impedes the flow of current through the succeeding spots as these welding operations proceed and causes the current to be deflected back to the adjacent welds previously completed and results in an excessive amount of current thereby being deflected from the spots being welded and an unsatisfactory weld then results. This may be true even though the material being welded combines by welding readily with the steel plate under normal conditions of welding. In this situation it is the progressive welding of successive joints at closely contiguous points that causes the difficulty. Likewise, sputtering of molten metal particles in the making of early spots may place such sputters on the plate in the position of succeeding spot welds and cause difficulties similar to those described in connection with the formation of oxides. In the preparatory uniting of the troublesome sheet with a low carbon iron or other suitable sheet by hot rolling or casting, these oxides do not act to give trouble as they do in the successive spot welding of extended sheets since the oxides present stay molten and also because there is no flow of electric current to be disturbed.

According to the present invention, the vessel, or other article, may be provided with a liner of the metals above mentioned attached to the body of the vessel by electric resistance spot welding. This is accomplished by interposing between such metal and the body of the vessel an intermediate layer of a metal which may be effectively bonded with the base metal by electric spot welding and which may be united to the corrosive resistant metal by other processes such as by forging, rolling or casting.

In practice, it has been found desirable to form the liner sheet of laminated structure made up of two sheets integrally united to each other throughout their opposed faces. The laminated or composite liner may be formed by any of the methods now known in the industry such as by casting a composite ingot and then rolling to the desired thickness, by rolling together at a high temperature two sheets of the desired composition, or by forging the two sheets together.

The laminated liner sheet so formed is applied to the vessel, or other article to be surfaced with corrosive resistant material, with the corrosive resistant metal facing outwardly and the liner is then spot welded to the body of the vessel in the manner set forth in Patent No. 1,680,276, before mentioned.

Figure 2:
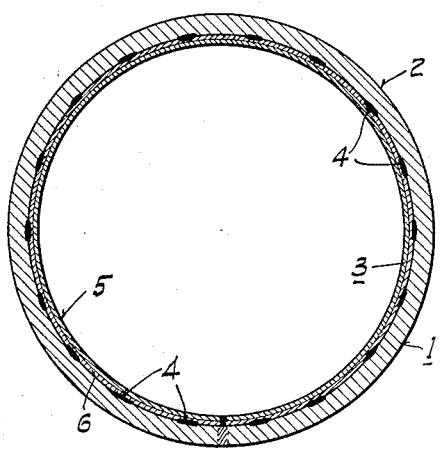
Figure 3:
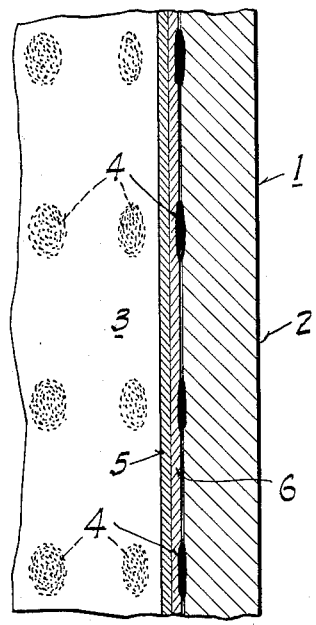

For a better understanding of the invention, attention is now directed to the accompanying drawing in which:

Figure 1 is a longitudinal sectional view of a pressure vessel having a liner applied thereto according to the invention, Fig. 2 is a transverse sectional view of a similar vessel, and Fig. 3 is an enlarged fragmentary sectional view.

In the drawing, the numeral 1 designates a vessel, such as an oil cracking vessel, of any suitable type. As shown, the body of the vessel is formed from a plurality of ring sections 2 aligned end to end with the abutting edges arc welded together.

The interior of the vessel is lined with a laminated sheet 3 secured to the body of the vessel by spot welds 4 which are preferably produced by the electric resistance method as disclosed in the patent previously referred to. The exposed section 5 of the laminated sheet may be of any metal capable of giving the desired surface to the vessel. The remaining section 6 of the laminated sheet 3 may be of any metal capable of being spot welded to the body of the vessel and which may be united to the surface section 5. Soft iron or low carbon steel has been found suitable for such purpose. As before pointed out, sections 5 and 6 may be integrally united by any of the processes above mentioned before being applied to the vessel.

Although the invention has been described in connection with pressure vessels where it has been found to have numerous advantages, it is clear that the invention will find other applications and it is not the intention to limit the invention to the preferred embodiment described. It is understood that modifications within the scope of the accompanying claims including equivalents do not constitute a departure from the invention.

I claim:

1. The method of joining a corrosion resistive alloy sheet to a metal plate which comprises first welding to said alloy sheet throughout its extent a sheet of metal which is suitable for joinder with the metal plate by progressive resistance spot welding without the formation of detrimental oxides between itself and the plate as the welding progresses, placing the above combined sheets upon the plate with the added sheet in contact with said plate, and uniting said sheets with said plate by the progressive application of resistance spot welding therebetween at close and contiguous points.

2. A method of resistance spot welding a protective surface of metal on a metal article, said metal having the characteristic of not uniting readily with the metal of said article as the spot welding progresses due to the formation of oxides, which comprises uniting such surface sheet of metal having the desired protective characteristics and a sheet of metal the successive spot welding to the article of which will not produce troublesome oxides, such uniting forming a laminated sheet, bringing said laminated sheet in welding relation to the article with said last named metal in contact with said article, and successively resistance welding said laminated sheet to the article at close and contiguous points.

3. The method of lining a steel container with a layer of corrosion-resistant metal which comprises forming a laminated sheet of corrosion-resistant metal and a metal which will unite readily with the steel container throughout a procedure of successive resistance spot welding therebetween, bringing said laminated sheet in welding relation to the inner surface of the steel container with the corrosion-resistant material facing inwardly of the container, and progressively resistance spot welding said laminated sheet to the steel container at close and contiguous points.

4. The method of providing a corrosion-resistant protective lining for a metal article which comprises forming a composite sheet composed of a sheet of metal adapted to be joined to the metal article by successive spot welding without the production of oxides or sputters of such a nature as to materially impede such joining and a corrosion-resistant sheet selected from the following group of metals, copper, bronze, nickel and Monel metal, bringing said composite sheet in welding relation with said metal article with the first named member of said composite sheet in contact with said article, and successively resistance spot welding said composite sheet to said metal article.

ORRIN E. ANDRUS.